US012387004B2

United States Patent
Farre Guiu et al.

(10) Patent No.: US 12,387,004 B2
(45) Date of Patent: Aug. 12, 2025

(54) MACHINE LEARNING MODEL-BASED CONTENT ANONYMIZATION

(71) Applicant: Disney Enterprises, Inc., Burbank, CA (US)

(72) Inventors: Miquel Angel Farre Guiu, Bern (CH); Pablo Pernias, Sant Joan D'Alacant (ES); Marc Junyent Martin, Barcelona (ES)

(73) Assignee: Disney Enterprises, Inc., Burbank, CA (US)

( * ) Notice: Subject to any disclaimer, the term of this patent is extended or adjusted under 35 U.S.C. 154(b) by 318 days.

(21) Appl. No.: 17/703,686

(22) Filed: Mar. 24, 2022

(65) Prior Publication Data
US 2022/0343020 A1    Oct. 27, 2022

Related U.S. Application Data

(60) Provisional application No. 63/178,342, filed on Apr. 22, 2021.

(51) Int. Cl.
*G06F 21/62* (2013.01)
*G06N 3/045* (2023.01)
*G06N 3/08* (2023.01)

(52) U.S. Cl.
CPC ......... *G06F 21/6254* (2013.01); *G06N 3/045* (2023.01); *G06N 3/08* (2013.01)

(58) Field of Classification Search
CPC ....... G06F 21/6254; G06N 3/045; G06N 3/08
USPC .......................................................... 726/28
See application file for complete search history.

(56) References Cited

U.S. PATENT DOCUMENTS

| 9,782,595  | B2 * | 10/2017 | Greene  | A61N 1/37276 |
| 10,839,104 | B2   | 11/2020 | Balzer  |              |
| 10,929,561 | B2 * | 2/2021  | Long    | G06V 40/161  |
| 11,093,632 | B1   | 8/2021  | Ton-That |             |

(Continued)

FOREIGN PATENT DOCUMENTS

KR    102259457 B1    6/2021

OTHER PUBLICATIONS

Mendels, Omri "Custom NLP Approaches to Data Anonymization: Practical ways for de-identifying real-world private data" Jan. 8, 2020 pp. 1-15.

(Continued)

*Primary Examiner* — Moeen Khan
(74) *Attorney, Agent, or Firm* — Farjami & Farjami LLP

(57) ABSTRACT

A system includes a computing platform having processing hardware, and a system memory storing software code and a machine learning (ML) model. The processing hardware is configured to execute the software code to receive from a client, a request for a dataset, the request identifying a content type of the dataset, obtain the dataset having the content type, and select, based on the content type, an anonymization technique for the dataset, the anonymization technique selected so as to render at least one feature included in the dataset recognizable but unidentifiable. The processing hardware is further configured to execute the software code to anonymize, using the ML model and the selected anonymization technique, the at least one feature included in the dataset, and to output to the client, in response to the request, an anonymized dataset including the at least one anonymized feature.

12 Claims, 5 Drawing Sheets

(56) References Cited

U.S. PATENT DOCUMENTS

| | | |
|---|---|---|
| 2009/0313170 A1 | 12/2009 | Goldner |
| 2012/0030165 A1* | 2/2012 | Guirguis ............. G06F 21/6254 |
| | | 707/E17.007 |
| 2015/0324633 A1* | 11/2015 | Whitehill ............. G06V 40/174 |
| | | 382/248 |
| 2019/0373210 A1* | 12/2019 | Nguyen ................. G06V 20/59 |
| 2021/0004486 A1 | 1/2021 | Adams |
| 2021/0319537 A1* | 10/2021 | Hiasa ........................ G06T 5/73 |
| 2021/0342479 A1 | 11/2021 | Schluntz |

OTHER PUBLICATIONS

Zhang, Hang; Dana, Kristin "Multi-style Generative Network for Real-time Transfer" MIT License 2017 pp. 1-7.

"DeepPrivacy: A Generative Adversarial Network for Face Anonymization" MIT License 2019 pp. 1-7.

Yuang, Kaiyu; Yau, Jacqueline; Fei-fei, Li; Deng, Jia; Russakovsky, Olga "A Study of Face Obfuscation in ImageNet" Mar. 14, 2021 pp. 1-16.

www.paraphrase-Online.com Apr. 22, 2021 pp. 1-3.

beta.openAI.com Apr. 22, 2021 pp. 1-6.

\* cited by examiner

Activities

1. Apologizing
2. Backslapping
3. Crying
4. Dancing
5. Fencing
6. Fist bumping
7. Flirting
8. Hand-to-hand fighting
9. Hand clapping
10. Handshaking
11. High-fiving
12. Holding hands
13. Hugging
14. Making an introduction
15. Kissing
16. Laughing
17. Performing magic
18. Pushing
19. Resuscitation
20. Silence

| Content Type | Additional information provided |
|---|---|
| Image / video | Darkness, color palette, sharpness compared to other samples |
| Text / Audio | Types of entities mentioned, sentiment of the sentence |
| Audio | Presence of music and environmental noise |

Fig. 5

MACHINE LEARNING MODEL-BASED CONTENT ANONYMIZATION

RELATED APPLICATIONS

The present application claims the benefit of and priority to a pending Provisional Patent Application Ser. No. 63/178,342, filed Apr. 22, 2021, and titled "Content Anonymization for Accelerated Machine Learning Development," which is hereby incorporated fully by reference into the present application.

BACKGROUND

There are many undertakings that can be advanced more efficiently when performed collaboratively. However, due to any of potentially myriad privacy or confidentiality concerns, it may be undesirable to share data including proprietary or otherwise sensitive information in a collaborative or other semi-public or public environment.

By way of example, collaborative machine learning development endeavors, such as "hackathons" for instance, can advantageously accelerate the process of identifying and optimizing machine learning models for use in a variety of applications, such as activity recognition, location recognition, facial recognition, and object recognition. However, due to the proprietary nature or sensitivity of certain types of content, it may be undesirable to make such content generally available for use in model training.

One conventional approach to satisfying the competing interests of content availability and content security for machine learning development is to utilize a remote execution platform as a privacy shield between model developers and content owners. According to this approach, the remote execution platform can mediate training of a machine learning model using proprietary content, while sequestering that content from the model developer. However, one disadvantage of this approach is that, because the model developer is prevented from accessing the content used for training, it is difficult or impossible to accurately assess the performance of the machine learning model subsequent to training but prior to deployment. Consequently, there is a need in the art for a solution that enables the selective cloaking or anonymization of proprietary or sensitive content included in shared data.

BRIEF DESCRIPTION OF THE DRAWINGS

FIG. 2 shows a table listing some exemplary activities that a trainee ML model may be trained to recognize, according to one implementation;

FIG. 5 shows a table providing examples of extra information that may be passed to a development collaborator as a text string accompanying anonymized content, according to one implementation.

DETAILED DESCRIPTION

Figure 1:
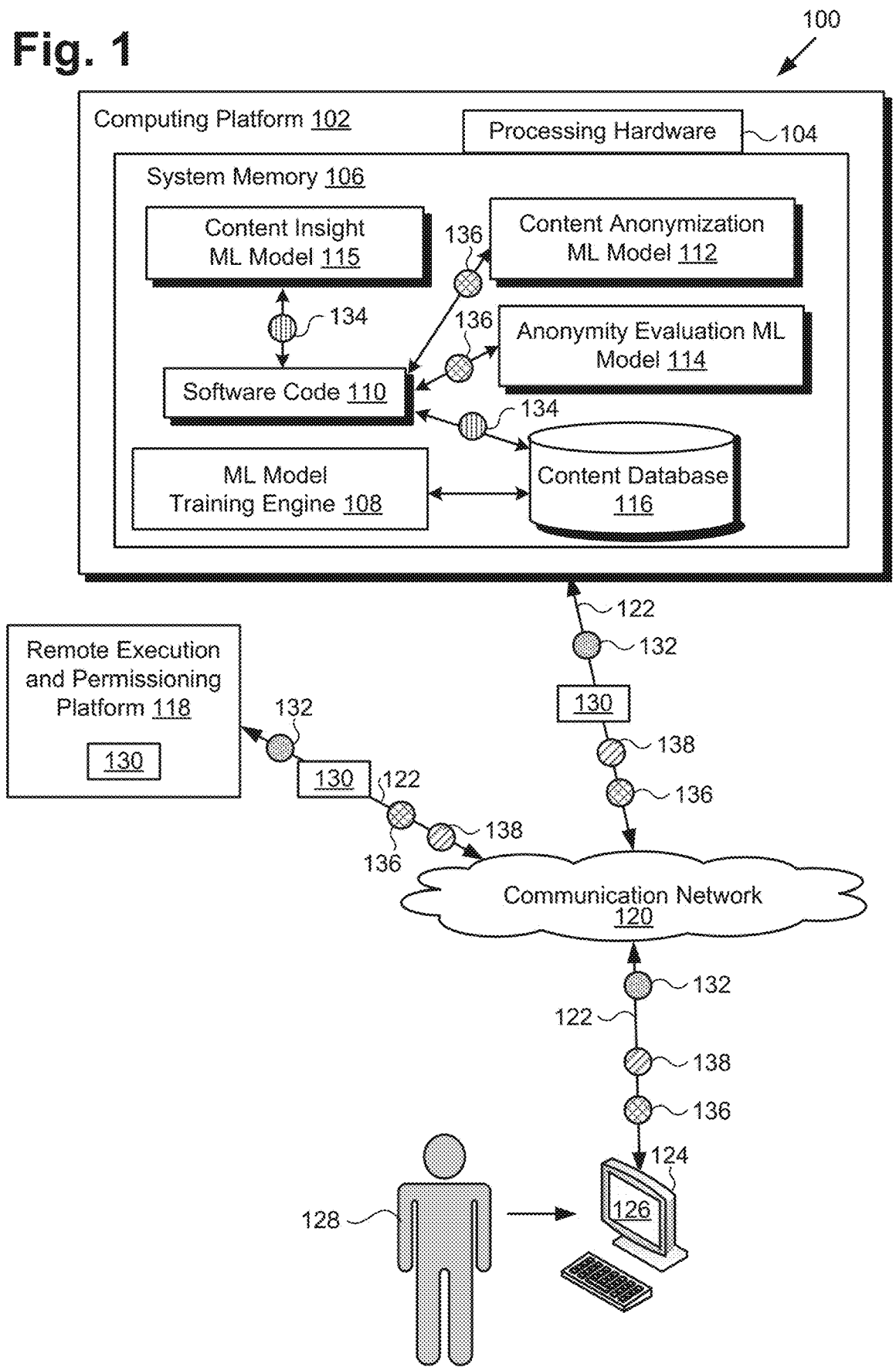
FIG. 1 shows a diagram of an exemplary system for performing machine learning (ML) model-based content anonymization, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by:like or corresponding reference numerals. Moreover, the drawings and illustrations in the present application are generally not to scale, and are not intended to correspond to actual relative dimensions.

As noted above, collaborative machine learning development endeavors, such as "hackathons" for example, can advantageously accelerate the process of identifying and optimizing machine learning models for use in a variety of applications, such as activity recognition, location recognition, facial recognition, and object recognition, to name a few examples. However, due to the proprietary nature or sensitivity of certain types of content, it may be undesirable to make such content generally available for use in model training. As further noted above, one conventional approach to satisfying the competing interests of content availability and content security for machine learning development is to utilize a remote execution platform as a privacy shield between model developers and content owners. According to this approach, the remote execution platform can mediate training of a machine learning model using proprietary content, while sequestering that content from the model developer. However, one disadvantage of this approach is that, because the model developer is prevented from accessing the content used for training, it is difficult or possible to accurately assess the performance of the machine learning model subsequent to training but prior to deployment.

The present application discloses systems and methods for performing machine learning model-based content anonymization that address and overcome the challenges to effective collaboration described above. It is noted that although the present content anonymizing solution is described below in detail by reference to the exemplary use case of activity recognition in the interests of conceptual clarity, the present novel and inventive principles may be advantageously applied to a wide variety of machine learning predictive processes. Moreover, the content anonymizing solution disclosed herein may advantageously be implemented as an automated process.

It is noted that, as defined in the present application, the terms "automatic," "automated," and "automating" refer to systems and processes that do not require human intervention. Although in some implementations a human system administrator may review the content anonymizing performance of the systems and methods described herein, that human involvement is optional. Thus, the methods described in the present application may be performed under the control of hardware processing components of the disclosed automated systems.

It is further noted that, as defined in the present application, the expression "machine learning model" (hereinafter "ML model") refers to a mathematical model for snaking future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs).

A "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network.

FIG. 1 shows system 100 for performing ML model-based content anonymization, according to one exemplary implementation. As shown in FIG. 1, system 100 includes computing platform 102 having processing hardware 104 and system memory 106 implemented as a computer-readable non-transitory storage medium. According to the present exemplary implementation, system memory 106 stores software code 110, ML model training engine 108, content anonymization ML model 112, anonymity evaluation ML model 114, content insight ML model 115, and content database 116 storing content for use in training ML models, as well as for testing the performance of such models subsequent to training.

As further shown in FIG. 1, system 100 is implemented within a use environment including communication network 120 providing network communication inks 122, remote execution and permissioning platform 118, client system 124 including display 126, and machine learning model development collaborator 128 (hereinafter "client 128") utilizing client system 124. Also shown in FIG. 1 are trainee ML model 130, request 132 for dataset 134, dataset 136 including one or more anonymized features (hereinafter "anonymized dataset 136") provided as an output of system 100 in response to request 132, and optional insights 138 providing clarifying information for the one or more anonymized features included in anonymized dataset 136. It is noted that anonymized dataset 136 represents dataset 134 after anonymization of one or more features included in dataset 134 has been performed.

Although the present application refers to one or more of software code 110, ML model training engine 108 content anonymization ML model 112, anonymity evaluation ML model 114, content insight ML model 115, and content database 116 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory lay include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 110, ML model training engine 108, content anonymization ML model 112, anonymity evaluation ML model 114, content insight ML model 115, and content database 116 as being co-located in system memory 106, that representation is also merely provided as an aid to conceptual clarity. More generally, system 100 may include one or more computing platforms 102, such as computer servers for example, which may be co-located or may form an interactively linked but distributed system, such as a cloud-based system, for instance. As a result, processing hardware 104 and system memory 106 may correspond to distributed processor and memory resources within system 100. Consequently, in some implementations, one or more of software code 110, ML model training engine 108, content anonymization ML model 112, anonymity evaluation ML model 114, content insight ML model 115, and content database 116 may be stored remotely from one another on the distributed memory resources of system 100.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over communication network 120 in the form of a packet-switched network such as the Internet, for example. Moreover, in some implementations, communication network 120 may be a high-speed network suitable for high performance computing (HPC), for example a 10 GigE network or an Infiniband network. In some implementations, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines.

Although client system 124 is shown as a desktop computer in FIG. 1, that representation is provided merely as an example as well. More generally, client system 124 may be any suitable mobile or stationary computing device or system that includes display 126 and implements data processing capabilities sufficient to provide a user interface, support connections to communication network 120, and provide the functionality ascribed to client system 124 herein. For example, in other implementations, client system 124 may take the form of a laptop computer, tablet computer, or smartphone, for example.

With respect to display 126 of client system 124, display 126 may be implemented as a liquid crystal display (LCD), light-emitting diode (LED) display, organic light-emitting diode (OLED) display, quantum dot (QD) display, or any other suitable display screen that perform a physical transformation of signals to light. Furthermore, display 126 may be physically integrated with client system 124 or may be communicatively coupled to but physically separate from client system 124. For example, where client system 124 is implemented as a smartphone, laptop computer, or tablet computer, display 126 will typically be integrated with client system 124. By contrast, where client system 124 is implemented as a desktop computer, display 126 may take the form of a monitor separate from client system 124 in the form of a computer tower.

According to the exemplary implementation shown in FIG. 1, client 128 uses client system 124 and communication network 120 to deliver trainee ML model 130 to remote execution and permissioning platform 118 for training. Remote execution and permissioning platform 118 mediates training of trainee ML model 130 on computing platform 102 of system 100, using ML model training engine 108 and content obtained from content database 116, while that content, which may be proprietary or otherwise sensitive, remains inaccessible to client system 124 and client 128. As shown in FIG. 1, trainee ML model 130 may be transferred to ML model training engine 108 of system 100 via communication network 120 and network communication links 122. Trainee ML model 130 may be trained for any of a variety of applications. By way of example, in some implementations, trainee ML model 130 may be trained to perform activity recognition. Table 200, in FIG. 2, lists some exemplary activities that trainee ML model 130 may be trained to recognize. It is noted that the activities listed in table 200 are merely provided by way of example. More generally, trainee ML model 130 may be trained to recognize any action, to serve as a predictive model or a generative model, or to perform one or more of a wide variety of inferential problem solving tasks.

Figure 3:
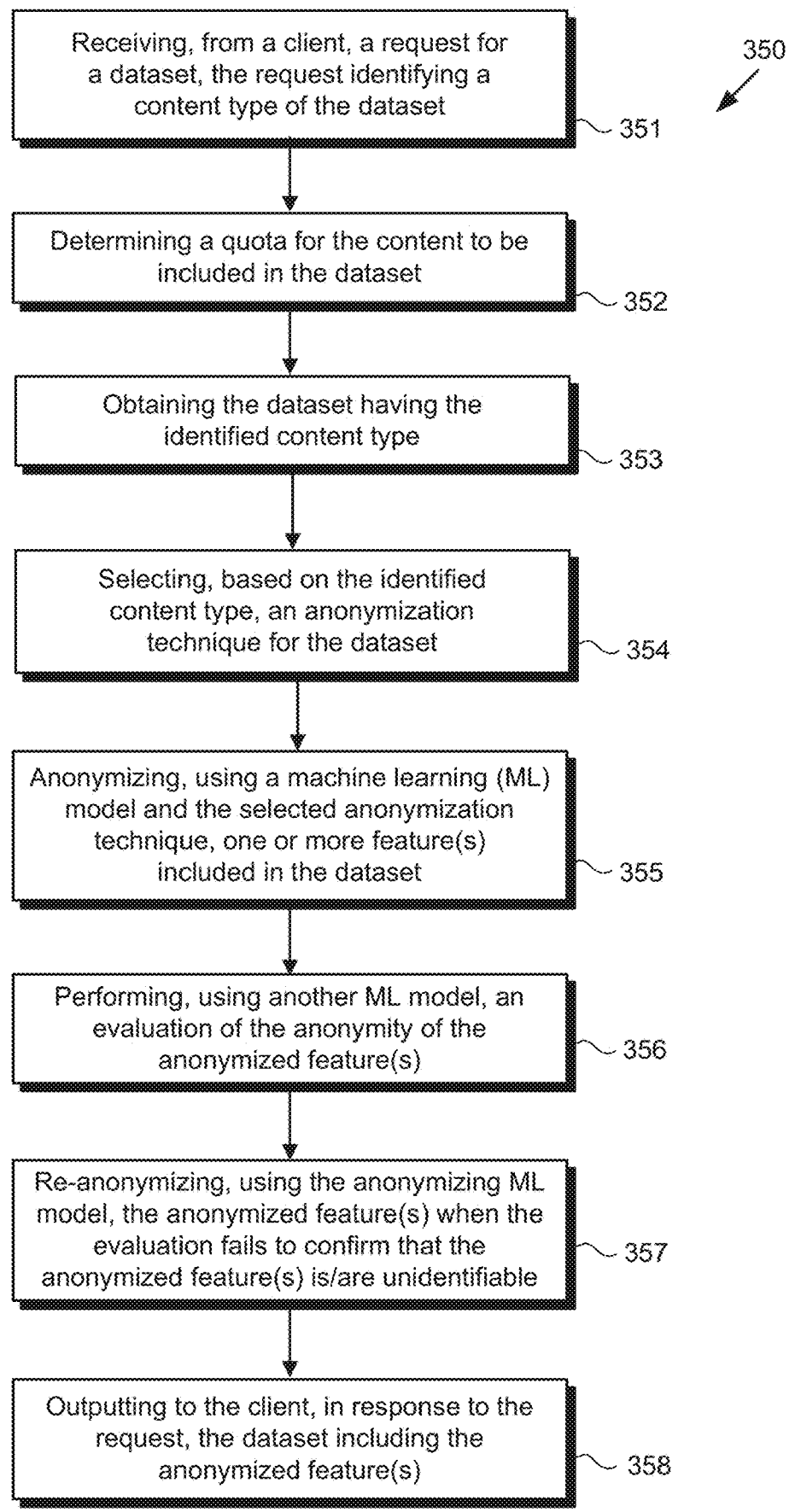
FIG. 3 shows a flowchart describing an exemplary method for performing ML model-based content anonymization, according to one implementation.

The functionality of system 100 and software code 110 will be further described by reference to FIG. 3. FIG. 3 shows flowchart 350 presenting an exemplary method for performing ML model-based content anonymization, according to one implementation. With respect to the method outlined in FIG. 3, it is noted that certain details and features have been left out of flowchart 350 in order to not obscure the discussion of the inventive features in the present application.

Referring now to FIG. 3 in combination with FIG. 1, flowchart 350 includes receiving from client 128, request 132 for dataset 134, request 132 identifying the content type of dataset 134 (action 351). Dataset 134 may include unstructured data, for example. In some implementations, dataset 134 may include one or more of a variety of different content types, such as images, audio samples, and text, for example. Specific examples of images include graphics, digital photographs, or video frames, to name a few. Alternatively, or in addition, dataset 134 may include audio samples including speech, music, or sound effects, for instance. As another alternative, or in addition, dataset 134 may include text, as noted above. Moreover, in some implementations, the type of content identified by request 132 may be or include digital representations of persons, fictional characters, locations, objects, and identifiers such as brands and logos, for example, that populate a virtual reality, augmented reality, or mixed reality environment.

According to the exemplary implementation shown in FIG. 1, dataset 134 may include validation data for use in assessing the training of trainee ML model 130. As further shown in FIG. 1, in some implementations, request 132 may be received from client system 124 utilized by client 128, via remote execution and permissioning platform 118 and communication network 120. However, in other implementations, request 132 may be received directly from client system 124 via communication network 120. In various implementations, request 132 may be received in action 351 by software code 110, executed by processing hardware 104 of computing platform 102.

In some implementations, flowchart 350 may include determining a quota for the content to be included in dataset 134 (action 352). In various use cases it may be advantageous or desirable to limit the amount of data provided by system 100, based either on the type of content sought by request 132, the identity of client 128, or both. For example, system 100 may cap the total amount of data available to any client, or the total amount of data available to an individual client based on the identity of that client. Alternatively, or in addition, system 100 may cap the total amount of data made available based on content type, where more content in the form of audio samples, for instance, is available to a client than content in the form of video frames or other images, or vice versa. Where client 128 makes repeated requests for datasets from system 100, system 100 may determine a quota for the content to be included in any particular dataset 134 so as prevent client 128 from exceeding the allowable limit.

It is noted that action 352 is optional, and in some implementations may be omitted from the method outlined by flowchart 350. However, in implementations in which action 352 is performed, the quota for the content to be included in dataset 134 may be determined by software code 110, executed by processing hardware 104 of computing platform 102, based on one or both of the content type or an identity of client 128.

Flowchart 350 further includes obtaining dataset 134 (action 353). As shown in FIG. 1, in some implementations, dataset 134 may be obtained from content database 116 of system 100, in action 353, by software code 110, executed by processing hardware 104 of computing platform 102. Content database 116 may include hundreds, thousands, or tens of thousands of data samples, which may take a variety of forms including images, audio sample, text, and digital representations that populate a virtual reality, augmented reality, or mixed reality environment, as noted above.

Flowchart 350 further includes selecting, based on the content type identified by request 132, an anonymization technique for dataset 134, the anonymization technique selected so as to render one or more features included in dataset 134 recognizable but unidentifiable (action 354). It is noted that, as defined for the purposes of the present application, the term "recognizable" refers to detecting the generic nature of a feature, while the term "identifiable" refers to detecting characteristics of a feature that reveal its particular identity. By way of example, an anonymization technique for an image depicting Lake Tahoe may result in the anonymized image depicting a feature that is recognizable as a body of water but unidentifiable as Lake Tahoe per se.

Figure 4:
FIG. 4 shows a table listing some exemplary techniques suitable for use in anonymizing various types of content, according to one implementation.

Referring to FIG. 4, table 400 in FIG. 4 lists some exemplary techniques suitable for use in anonymizing various types of content. For example, and as shown in FIG. 4, where full images or video are to be anonymized, a multi-style transfer to remove stylistic cues may be performed, as further described by Reference 1 (https://github.com/zhang-hang1989/PyTorch-Multi-Style-Transfer), a copy of which is attached to Provisional Patent Application Ser. No. 63/178,342, and is incorporated herein by reference, as one example of a conventional approach. In addition, or alternatively, acid as further shown in FIG. 4, where a region of interest (ROI) within an image or video is to be anonymized, face swapping or Gaussian blur techniques may be employed, as further described, respectively, by Reference 2 (https://github.com/hukkelas/
DeepPrivacy?utm_source=thenewstack&utm_medium=website&utm_campaign=pl and Reference 3 (NPL: A Study of Face Obfuscation in ImageNet, by Yang, et al., dated Mar. 14, 2021), copies of which are attached to Provisional Patent Application Ser. No. 63/178,342, and are incorporated herein by reference, as examples of conventional approaches. Moreover and as also shown in FIG. 4, where text within an image or video is to be anonymized, various text paraphrasing techniques may be used, as further described by Reference 4 (https://www.paraphrase-online.com) and Reference 5 (https://beta.openai.com), copies of which are attached to Provisional Patent Application Ser. No. 63/178,342, and are incorporated herein by reference, as examples of conventional approaches. It is noted that where audio is to be anonymized, any suitable audio manipulation technique known in the art may be utilized.

Flowchart 350 further includes anonymizing, using content anonymization ML model 112 and the anonymization technique selected in action 354, at least one feature included in dataset 134 (action 355). In various implementations, for example, the one or more features anonymized in action 355 may include an activity, location, or a depiction of a person or character. As noted above, the anonymization performed in action 355 is directed to rendering that/those feature(s) recognizable but unidentifiable. By way of example, where dataset 134 includes an image of "Character A" smiling or laughing, the corresponding anonymized image in anonymized dataset 136 may be recognizable as a character who is smiling or laughing, but may be unidentifiable as "Character A."

As another example, where dataset 134 depicts a location including a well-known building or landmark (e.g., the Eiffel Tower), the corresponding anonymized depiction in anonymized dataset 136 may be recognizable as a generic structure in place of the well-known building or landmark. As yet another example, where dataset 134 includes a video of a particular television (TV) series character having dinner in a fictional restaurant identified in the TV series, anonymized dataset 136 may enable recognition that a person is eating while rendering the TV series character, the fictional restaurant that only exists in the TV series, and the actual dialogue of the TV series script being spoken by the character unidentifiable.

It is noted that in some implementations, content anonymization ML model 112 may take the form of one or more trained neural networks (NNs). The anonymization of the feature or features included in dataset 134, in action 355, may be performed by software code 110, executed by processing hardware 104 of computing platform 102, and using content anonymization ML model 112, as noted above.

In some implementations, the method outlined by flowchart 350 may further include performing an evaluation of the anonymity of the one or more features anonymized in action 355 (action 356). In some implementations, evaluation of the anonymity of the anonymized feature or features included in anonymized dataset 136 may be performed by software code 110, executed by processing hardware 104 of computing platform 102, and using anonymity evaluation ML model 114, which, like content anonymization ML model 112, may take the form of one or more trained NNs. Thus, in some implementations, content anonymization ML model 112 may include one or more trained NNs, and anonymity evaluation ML model 114 may include one or more other NNs. It is noted that action 356 is optional, and in some implementations may be omitted from the method outlined by flowchart 350. In implementations in which action 356 is performed, it is performed in order to ensure that the specific features anonymized in action 355 are recognizable but unidentifiable after the anonymization process.

For example, the one or more features anonymized in action 355 may be run through classifiers, in action 356, that analyze the features to be anonymized, such as faces, logos, or backgrounds, for instance. Those classifiers can be part of system 100, i.e., anonymity evaluation ML model 114, or may be third party resources. The analysis may be repeated for all features anonymized in action 355.

As a specific example, prior to action 355, dataset 134 may be run through multiple classifiers, such as image, audio, and text classifiers in a preliminary recognition process to identify features in dataset 134 to be anonymized. For instance, dataset 134 may be run through multiple celebrity recognition or facial recognition classifiers to identify individual faces to be anonymized in action 355. In addition to identifying specific faces to be anonymized, the confidence values computed for the facial recognitions performed by each classifier can be evaluated. In one implementation, this preliminary process may be performed using anonymity evaluation ML model 114.

Action 355 may then be performed using content anonymization ML model 112. Action 356 may then include repeating the preliminary evaluation process on the one or more anonymized features using anonymity evaluation ML model 114, and comparing the results and confidence values with the results of the preliminary recognition process described above. The anonymization process can be considered successful if the confidence values drop by some predetermined or selectable threshold relative to their pre-anonymization values. If those confidence values fail to satisfy this threshold reduction, the parameters of content anonymization ML model 112 can be adjusted and actions 355 and 356 may be repeated until the confidence value threshold is satisfied, or the one or more features being anonymized become unidentifiable.

In implementations in which the method outlined by flowchart 350 includes action 356 described above, flowchart. 350 may further include re-anonynizing features anonymized its action 355 when the evaluation performed in action fails to confirm that the one or more anonymized features is/are unidentifiable (action 357). In essence, action 357 includes performing actions 355 and 356 iteratively until the evaluation performed in action 356 confirms that the one or more anonymized features is/are unidentifiable. Action 357 may be performed by software code 110, executed by processing hardware 104 of computing platform 102, and using content anonymization ML model 112, and in some implementations, anonymity evaluation ML model 114 as well.

In some implementations, it may be advantageous or desirable to provide client 128 with additional insights 138 to anonymized dataset 136, while maintaining the anonymity of specific features included in dataset 134. Referring to FIG. 5, table 500 provides examples of extra information (i.e., additional insights) that may be passed to client 128 as a text string accompanying anonymized dataset 136. Additional insights 138 "clues" may be generated by software code 110, executed by processing hardware 104, based on dataset 134 and the output of content insight ML model 115. Alternatively, or in addition, additional insights 138 may be generated manually, by a human editor.

Additional insights 138 generated using content insight ML model 115 can be added in all use cases or in any use cases in which it is deemed desirable to provide them for example, in cases in which the anonymization process eliminates a feature that may be relevant to request 132 for dataset 134. For instance, if a type of location is always dark (e.g., a cave) but the anonymization performed in action 355 causes that feature to become colorized while retaining its cave-like structure, it may be advantageous or desirable to provide additional insight 138 stating: "the cave-like structure is dark." Moreover, in some implementations it may be advantageous to generate additional insights 138 in instances when it is necessary to perform action 357. By way of example, in one implementation, action 355 may obfuscate or otherwise anonymize backgrounds in dataset 134, but some named entities such as "Famous Character X" may be recognizable from the audio track of dataset 134. In that situation, action 355 may result in the audio track being cut from dataset 134 and a text string being added to anonymized dataset 136 as an additional insight 138. For instance, the audio track including the statement "I must find Famous Character X" could be cut from dataset 134 and the following additional insight 138 could be added to anonymized. dataset 136: "the audio track includes the statement 'I must find John Doe'"

Flowchart 350 further includes outputting to client 128, in response to request 132, anonymized dataset 136 including the one or more anonymized features (action 358). In some implementations, for example, anonymized dataset 136 may be output to remote execution and permissioning platform 118, via communication network 120, for use in testing the performance of trainee ML model 130. However, in other implementations, anonymized dataset 136 may be output to client system 124 utilized by client 128, via communication network 120. Action 358 may be performed by software code 110, executed by processing hardware 104 of computing platform 102. Moreover, in some implementations, insights 1.38 may be output to remote execution and permissioning platform 118, to client system 124, or both, as an accompaniment to anonymized dataset 136.

As noted above, request 132 may specifically identify or characterize the content desired by client 128. In such use cases, where a predetermined number of iterations of actions 355 and 356 fail to confirm the anonymity of the anonymized feature or features of dataset 134, processing hardware 104 may execute software code 110 to obtain alternative content for anonymization and output to remote execution and permissioning platform 118 or client system 124. This alternative content could be selected by software code 110 based on its being comparable to the content identified by request 132, but capable of being successfully anonymized using action 355 or 357.

As further noted above, in various implementations, one or both of actions 356 and 357, as well as action 352, are optional. Thus, in some implementations, action 353 may follow directly from action 351. Moreover, in implementations in which actions 356 and 357 are omitted from the method outlined by flowchart 350, action 358 may follow directly from action 355. Alternatively, in implementations in which action 356 is included in the method and the evaluation performed in that action confirms that the one or more features anonymized in action 355 is/are unidentifiable, action 358 may follow directly from action 356, while action 357 may be omitted. That is to say, in those use cases, anonymized dataset 136 is output to client 128 when the evaluation performed in action 356 confirms that the one or more features anonymized in action 355 is/are unidentifiable.

With respect to the method outlined by flowchart 350, it is also noted that actions 351, 353, 354, 355, and 358, or actions 351, 352, 353, 354, 355 (hereinafter "actions 351-355") and 358, or actions 351, 353, 354, 355, 356, and 358, or actions 351-355, 356, and 358, or actions 351, 353, 354, 355, 356, 357, and 358, or actions 351-355, 356, 357, and 358, may be performed in an automated process from which human involvement may be omitted.

Thus, the present application discloses systems and methods for performing machine learning model-based content anonymization that address and overcome the drawbacks and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It, should also be understood that, the present application is not limited to the particular implementations described herein, but many rearrangements, modifications, and substitutions are possible without departing from the scope of the present disclosure.

What is claimed is:

1. A system comprising:
   a processing hardware; and
   a system memory storing a software code, a first trained neural network (NN) and a second trained NN;
   the processing hardware configured to execute the software code to:
      receive from a client, a request for a dataset, the request identifying a content type of the dataset, the dataset including an image;
      obtain the dataset having the content type;
      select, based on the content type, an anonymization technique for the dataset, the anonymization technique selected so as to render at least one feature included in the dataset recognizable but unidentifiable;
      anonymize, using the first trained NN and the selected anonymization technique, the at least one feature included in the image, such that a generic nature of the at least one feature included in the image is maintained by anonymizing, but an identifiable nature of the at least one feature included in the image is removed by anonymizing, wherein the at least one feature included in the image and anonymized is indicative of at least one of a location where the image is captured or an activity being performed, wherein the activity includes one of dancing, fencing, first bumping, hand-to-hand fighting, hand clapping, handshaking, hand-fiving, holding hands, hugging, performing magic, or pushing;
      evaluate, using the second trained NN, an anonymity of the at least one anonymized feature;
      re-anonymize, using the first trained NN, the at least one anonymized feature when evaluating the anonymity of the at least one anonymized feature fails to confirm that the at least one anonymized feature is unidentifiable, until when evaluating the anonymity of the at least one anonymized feature indicates that a confidence value of the at least one anonymized feature being unidentifiable satisfies a predetermined threshold; and
      output to the client, in response to the request, an anonymized dataset including the image having the at least one anonymized feature.

2. The system of claim 1, wherein the at least one feature included in the image and anonymized is indicative of the location where the image is captured.

3. The system of claim 1, wherein prior to obtaining the dataset having the content type, the processing hardware is further configured to execute the software code to:
  determine that quota for content having the content type does not exceed an allowable limit; and
  in response to determining, including the content in the dataset having the content type.

4. The system of claim 1, wherein the image is in a video frame.

5. The system of claim 1, wherein the at least one feature included in the image further comprises a depiction of a person or a character, and the at least one feature and anonymized is indicative of the location where the image is captured and includes one of a building, a landmark or a restaurant.

6. The system of claim 1, wherein the content type comprises digital representations that populate a virtual reality, augmented reality, or mixed reality environment.

7. A method for use by a system including a processing hardware, and a system memory storing a software code, a first trained neural network (NN) and a second trained NN, the method comprising:
  receiving from a client, by the software code executed by the processing hardware, a request for a dataset, the request identifying a content type of the dataset, the dataset including an image;
  determining, by the software code executed by the processing hardware, quota for content having the content type does not exceed an allowable limit;
  obtaining, by the software code executed by the processing hardware, the dataset having the content type and including the content;
  selecting, by the software code executed by the processing hardware, based on the content type, an anonymization technique for the dataset, the anonymization technique selected so as to render at least one feature included in the dataset recognizable but unidentifiable;
  anonymizing, by the software code executed by the processing hardware and using the first trained NN and the selected anonymization technique, the at least one feature included in the image, such that a generic nature of the at least one feature included in the image is maintained by anonymizing, but an identifiable nature of the at least one feature included in the image is removed by anonymizing, wherein the at least one feature included in the image and anonymized is indicative of at least one of a location where the image is captured or an activity being performed, wherein the activity includes one of dancing, fencing, first bumping, hand-to-hand fighting, hand clapping, handshaking, hand-fiving, holding hands, hugging, performing magic, or pushing;
  evaluate, by the software code executed by the processing hardware and using the second trained NN, an anonymity of the at least one anonymized feature;
  re-anonymize, by the software code executed by the processing hardware and using the first trained NN, the at least one anonymized feature when evaluating the anonymity of the at least one anonymized feature fails to confirm that the at least one anonymized feature is unidentifiable, until when evaluating the anonymity of the at least one anonymized feature indicates that a confidence value of the at least one anonymized feature being unidentifiable satisfies a predetermined threshold; and
  outputting to the client, by the software code executed by the processing hardware in response to the request, an anonymized dataset including the image having the at least one anonymized feature.

8. The method of claim 7, wherein the at least one feature included in the image and anonymized is indicative of the location where the image is captured.

9. The method of claim 7, wherein prior to obtaining the dataset having the content type, the method further comprises:
  determining, by the software code executed by the processing hardware, that quota for content having the content type does not exceed an allowable limit; and
  in response to determining, including, by the software code executed by the processing hardware, the content in the dataset having the content type.

10. The method of claim 7, wherein the image is in a video frame.

11. The method of claim 7, wherein the at least one feature included in the image further comprises a depiction of a person or a character, and the at least one feature and anonymized is indicative of the location where the image is captured and includes one of a building, a landmark or a restaurant.

12. The method of claim 7, wherein the content type comprises digital representations that populate a virtual reality, augmented reality, or mixed reality environment.

* * * * *